SPEECH CONTROLLED ANNOUNCING CALCULATOR

Filed Aug. 24, 1965 2 Sheets-Sheet 1

INVENTOR.

Walter H. Stenby

INVENTOR.

Walter H. Stenby

United States Patent Office 3,356,836

Patented Dec. 5, 1967

3,356,836

SPEECH CONTROLLED ANNOUNCING CALCULATOR

Walter H. Stenby, 98 Riverside Drive, New York, N.Y. 10024

Filed Aug. 24, 1965, Ser. No. 482,182
The portion of the term of the patent subsequent to Nov. 2, 1982, has been disclaimed
14 Claims. (Cl. 235—151)

The present application is a continuation-in-part application of my copending application Ser. No. 837,220, filed Aug. 31, 1959, now issued as U.S. Patent No. 3,215,-821, and of my copending application Ser. No. 174,357 filed Feb. 14, 1962, now abandoned.

The present invention relates to a speech controlled announcing calculator or computer, and more particularly to a calculator whose input is controlled by spoken words and which audibly reproduces computed results by reading out permanent recordings.

It is one object of the present invention to provide a calculator or computer which need not be manually operated and does not require the reading of results from number wheels or from a printed paper band.

Another object of the invention is to provide a calculator which performs calculating operations without requiring any physical activity of the operator so that the same may perform other tasks using the information provided by the calculator.

Another object of the invention is to provide a calculator which performs different calculations when different oral commands are spoken.

Another object of the invention is to announce by a reproduction of the recorded human voice, numbers represented by the output of a computer for example by the totalizer of a calculator.

With these objects in view, the present invention provides a preferably speech controlled computer or calculator which announces the results of operations by audibly reproducing recordings of the human voice pronouncing numbers.

One embodiment of the invention comprises a microphone for receiving spoken digital information and operational information regarding calculating operations; means for selectively converting the electric energy of the microphone representing digital information into digital command signals and into operational command signals; calculating apparatus including digital input means actuated by the digital command signals, and a plurality of operation control means actuated by the operational command signals, and a register means; record carrier means having recordings of a voice announcing numbers and controlled by the register means to place recordings representing the results of calculating operations in a read-out position; pick-up means cooperating with said record carrier means for reading out recordings in the read-out position; and speaker means, such as a loud-speaker or ear phones, controlled by the read-out means to audibly reproduce the read-out recordings.

The digital input means correspond to the digit keys of a calculator, preferably of the ten-key type, and the operation control means correspond to the function keys of a calculator, and may be associated with such calculating operations as taking of a total, subtraction, multiplication, addition, or non-addition.

The register means is a totalizer having ordinal register wheels and tens-transfer means, and the record carrier means include a plurality of preferably drum-shaped record carriers which are respectively driven by register wheels of the totalizer to place recordings representing the digits of the result of a calculating operation in an aligned position in which they are read out by the pick-up means which is driven in axial direction of the drums to successively read out recordings representing the ordinal digits of a result.

In accordance with a preferred embodiment of the invention, the microphone, or other means for transforming speech sound energy into electric energy, receives different sequences of phonetic sounds, which are words representing different digits and different calculating operations.

Selector means are provided which are responsive to only one sequence of phonetic sounds forming a word. When receiving the respective sequence of phonetic sounds, a command signal is produced by the selector means.

Preferably, each selector means includes a plurality of tuned means, such as band filters, which are respectively tuned to different complex electric waves corresponding to different phonetic sounds spoken into the microphone. Such "tuned means" are disclosed in detail in the following U.S. Patents: Dudley 2,195,081, Dreyfus 2,540,660, and Kalfaian 2,613,273, 2,673,893, and 2,705,-260.

In the preferred embodiment of the invention, the record carriers are ordinal drums each of which carries ten circumferentially spaced magnetic recordings which extend in axial direction, and the pick-up or read-out means include a transducer head which is moved in axial direction over the aligned recordings of several drums in the same manner as the eye passes over the indicia numbers of several number wheels of a conventional calculator.

The novel features which are considered as characteristic for the invention are set forth in particular in the appended claims. The invention itself, and additional objects and advantages thereof, will be best understood from the following description of a specific embodiment when read in connection with the accompanying drawings, in which:

Figure 1:
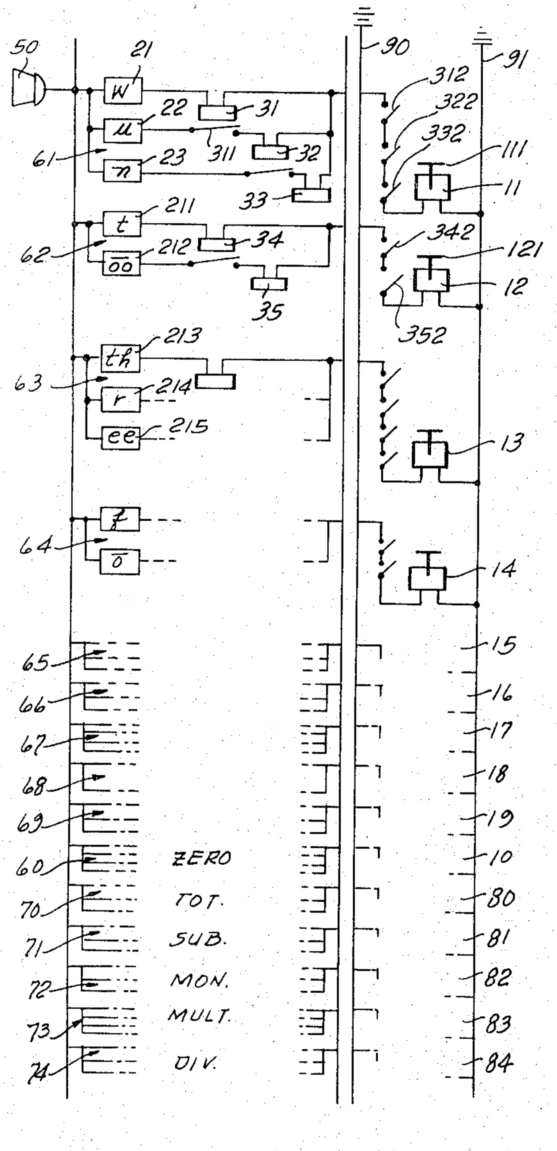
FIG. 1 is a schematic diagram illustrating the electric input circuit of a calculator according to one embodiment of the invention.

Referring now to the drawings, a ten-key calculator 100 comprises calculating mechanism, not shown, including a pin carriage, differential sensing means for sensing the pin carriage, and totalizer means including tens-transfer means. Calculating mechanism of this type is conventional, and, for example disclosed in the U.S. Patents 2,203,336, 1,957,617, 2,289,055, and in numerous other patents. However, the input keys and function keys of the standard ten-key calculators are omitted in the present invention.

Referring now to FIG. 1, a sound receiving means, shown to be a microphone 50, is connected to a series of selector means 61 to 69, respectively associated with the digits from 1 to 9, selector means 60 associated with the digit 0, selector means 70 associated with total taking, selector means 71 associated with subtraction, selector means 72 associated with non-addition, selector means 73 associated with multiplication, and selector means 74 associated with division. Only selector means 61 and 62 are shown in detail, and the other selector means are correspondingly constructed. Each selector means includes a set of tuned means whose number corresponds to the number of phonetic sounds in a sequence of phonetic sounds constituting a word representing either a digit, or a calculating operation such as total taking which may be represented by the abbreviation "tot." Other operations are represented by the words "sub," "non," "mult," and "div."

Selector means 61 is shown to include three tuned means 21, 22, 23 for the digit 1 which includes three phonetic sounds w-u-n- using the phonetic symbols of Webster's Dictionary. Selector means 62 has two tuned means 111, and 112 representing the phonetic sounds t-oo corresponding to the digit 2. Selector means 63 has three tuned means 213, 214, and 215, respectively representing the phonetic sounds th-r-ee which form the word representing the digit 3. Selector means 64 has two tuned means respectively tuned to the complex waves produced by the microphone 50 when the two phonetic sounds f-o are pronounced as the word which represents the digit 4. Selector means 65 to 69 have different numbers of tuned means, not shown, respectively tuned to the phonetic sounds which form the words representing the digits 5 to 9. Selector means 60 has four tuned means, not shown, representing the phonetic sounds of the word "zero." Selector means 70 to 74 have different numbers of tuned means respectively corresponding to the phonetic sounds required for representing the several calculating operations which are to be performed.

A relay 31 is connected in series with tuned means 21 and controls a switch 311 connected in series with tuned means 22, and a switch 312 connected into another circuit which includes a line connected to a source of electric current 90, and another line 91 connected to ground. Another relay 32 is connected in series with tuned means 22 and switch 311, and controls switch 321 and switch 322. Switch 321 is connected in series with the third tuned means 23, and with the relay 33 controlling switch 332 which is connected in series with switches 312 and 322. An electromagnetic operating means 11, provided with a movable armature 111 is connected in series with the three switches 312, 322, 332.

The selector means 62 is constructed in the same manner, but only two tuned means 211 and 212 representing the phonetic sounds t-oo of the word "two" are provided, which are connected in series, respectively, with relays 34 and 35. Relay 34 controls switches 341 and 342, and relay 35 controls switch 352. An electromagnetic operating means 12 including a movable armature 121 is connected in series with switches 342 and 352. Selector means 63 is shown to include three tuned means 213 to 216 for the word "three," and the respective circuit of selector means 63 includes relays and switches as described with reference to selector means 61, 62. An electromagnetic operating means 13 is again provided. Selector means 64 to 69, 60, 70 to 74 are not shown in detail but are constructed corresponding to the above described selector means. Each selector means is associated with an electromagnetic operating means 14 to 19, 10, 80 to 84, each of which has a movable armature.

Figure 2:
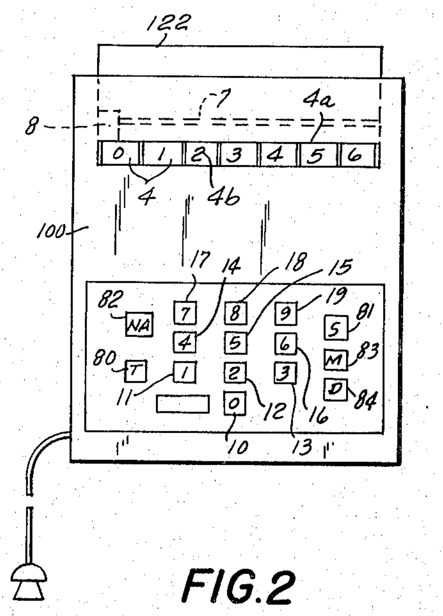
FIG. 2 is a schematic plan view of a calculator of the "ten-key" type controlled by the input circuit illustrated in FIG. 1.

The lower portion of FIG. 2 illustrates schematically the keyboard of a ten-key calculator. The digit keys are replaced by the electromagnetic operating means 10 to 19, and the several function keys associated with totalizing, non-addition, subtraction, multiplication, and division are replaced by the electromagnetic operating means 80 to 84. The arrangement corresponds substantially to the key actuator disclosed in the U.S. Patent 1,753,991, and if desired, the electromagnetic operating means may be arranged in the form of an adapter for operating existent digit and function keys of a standard ten-key calculator.

The calculator is operated in the following manner: Assuming that the word "one" is spoken into the microphone 50, actually three phonetic sounds w-u-n are spoken (using the phonetic transcription of Webster's Dictionary). The three tuned means 21, 22, 23 are respectively tuned to three different complex electric waves which are respectively associated with the phonetic sounds w, u, n.

When the phonetic sequence w, u, n, which represents the digit 1, is spoken into the microphone 50, a complex electrical wave corresponding to the phonetic sound "w" will pass through tuned means 21 and through relay 31. This will effect closing of switches 311 and 312. The next spoken sound is "u" and the corresponding electric wave will pass through tuned means 22, switch 311 and relay 32 which closes switches 321 and 322.

If the sound "u" would have been spoken before the sound "w," the corresponding electric wave could not have passed through tuned means 22, since switch 311 would not have been closed. When the phonetic sound "n" is spoken, the corresponding electric wave passes through tuned means 23, which is possible since switch 321 is closed, and also passes through relay 33 which closes switch 332. Since all switches, 312, 322, 332 which are connected in series with electromagnetic operating means 11 are now closed, electromagnetic operating means 11 is energized and moves its armature 111 to perform the function of the digit key 1 in a standard ten-key calculator.

Selector means 62 is operated by a sequence of two phonetic sounds, namely the sequence t-oo, and electromagnetic operating means 12 will only respond when the two phonetic sounds are spoken in the proper sequence. The other selector means are constructed in the same manner and have at least two tuned means so that the mechanism of the calculator is operated whenever a sequence of selected phonetic sounds to which one of the selector means is tuned, is spoken into the microphone.

Whenever a sequence of phonetic sounds representing a digit is spoken, a digital input signal actuates the respective operating means 10 to 19, and whenever a word representing a calculating operation is spoken, an operational command signal is supplied to one of the operating means 80 to 84. For example, when the sequence t-o-t is spoken into the microphone, only selector means 70 will respond since it is provided with three corresponding tuned means, not shown, and actuates operating means 80 which performs in the calculator 100 an operation corresponding to the depression of a total key of a standard ten-key calculator.

It will be understood that the conventional calculating mechanism of calculator 100 will perform a calculating operation with introduced numbers, and that the result of such calculating operations will be registered in the standard totalizer including ordinal register wheels and tens-transfer means so that register wheels will assume digital positions for representing the result number.

Figure 4:
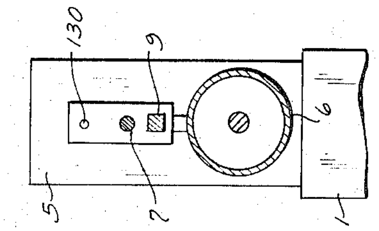
FIG. 4 is a cross-sectional view of the embodiment of FIG. 3 taken on line IV—IV in FIG. 3.
Figure 3:
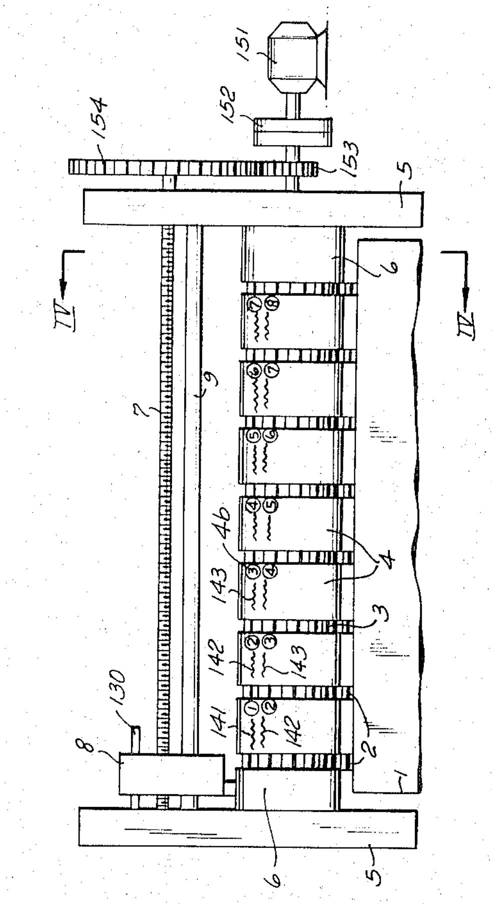
FIG. 3 is a fragmentary schematic elevation illustrating the read-out device of the embodiment of FIG. 2.

Referring now to FIGS. 3 and 4, the ordinal register wheels 2, only partly shown in FIG. 3, are operated by the calculating mechanism or apparatus 1 of calculator 100, which is only schematically indicated in FIGS. 3 and 4. Register wheels 2 have gear teeth meshing with the gear teeth of corresponding ordinal gears 3, each of which is secured to a record carrier drum 4 so that the same are controlled and operated by the calculating apparatus to assume indicating positions representing the ordinal digits registered in the register wheels 2, and forming together a number representing the result of a calculating operation. The record carrier drums 4 correspond to the number wheels of a conventional calculator, and may be provided with indicia *4b* indicating the digits from 0 to 9 in circumferentially spaced positions, and indicia representing a number registered in the calculator and aligned in axial direction, may be read by the operator through a window *4a* shown in FIG. 2. The apparatus is assumed to have seven record carrier drums with indicia, which, in the position of FIG. 2, represent the number 123456. As the number wheels of standard calculators, the record carriers 4 turn between digital positions representing either an introduced number, or the result of a calculating operation.

In addition to the indicia of standard number wheels of conventional calculators, each record carrier drum 4 is provided with recordings 141, 142, 143, etc. which respectively are magnetic recordings of the words one, two, three, etc. Recordings 141, 142, 143, etc., extend in axial direction on the cylindrical peripheral surfaces of the record carrier drums 4, and each record carrier drum has ten recordings respectively corresponding to the digits from 0 to 9, which are circumferentially spaced about the periphery of the record carrier drums 4 in the same manner as indicating indicia 4*b* are spaced about the periphery of standard number wheels.

Supports 5 support the shaft, not shown, on which the record carriers 4 are mounted for turning movement, and two end members 6 having cylindrical peripheral surfaces of the same diameter as record carrier drums 4, are located between supports 5 and record carrier drums.

A guide means 9 of prismatic shape is supported on support 5 and extends parallel to the axis of rotation of the record carriers 4. A pick-up head, or other read-out means 8 is mounted on guide means 9 for straight movement between the illustrated home position located near end member 6 on the left, to an end position located near end member 6 on the right as viewed in FIG. 3. During such movement, the pick-up head 8 passes in axial direction successively over the record carriers 4. The recordings 141, 142, 143, etc., which are located in the path of movement of the pick-up head 8 are aligned in a read-out position, and produce impulses in pick-up head 8 when the same passes over the recordings.

Recordings 141, 142, 143, etc., are made by a human voice saying, for example, the words one, two, three, four, five, six, seven, eight, nine, zero. In the position illustrated in FIG. 3, the recordings in read-out position over which the pick-up head 8 passes represent from the left to the right the words zero, one, two, three, four, five, six.

A threaded spindle 7 is turnably mounted in support 5 and driven by a motor 151 over a clutch 152 and gears 153 and 154. Spindle 7 passes through a corresponding nut, not shown, in pick-up head 8 so that the same moves without turning along guide means 9 when motor 151 rotates spindle 7. A switch actuator 130 is mounted on pick-up head 8 and shifted to the right, as viewed in FIG. 3, when pick-up head 8 arrives in the illustrated home position, since switch actuator 130 abuts support 5. When pick-up head 8 arrives in its end position, switch actuator 130 abuts the other support 5 and is shifted to the left.

Figure 5:
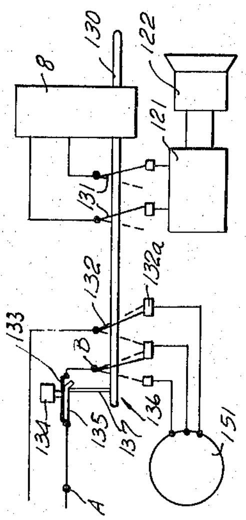
FIG. 5 is a diagram illustrating the electric circuit of the read-out and announcing means of the embodiment of FIG. 2.

The function of switch actuator 130 will be best understood with reference to FIG. 5. The pick-up head 8 is connected to an amplifier 121 by switch 131. A speaker or ear phone 122, also shown in FIG. 2, is connected to amplifier 121. In the position of switch 131 in which the announcing means 121, 122 are connected to the pick-up head 8, the impulses created in the pick-up head when the same passes over the magnetic recordings 41, 42, 43, etc., in read-out positions, are supplied to amplifier 121, and transformed into sound waves and announced by speaker 122. When the pick-up head 8 arrives in its end position, switch actuator 130 is shifted by an abutment on support 5 so that switch 131 is shifted to the open position indicated in broken lines in FIG. 5. Consequently, announcing means 121, 122 are disconnected from the pick-up head 8 and during the following return movement of pick-up head 8 in the opposite direction from the end position to the home position, no sound is produced by the recordings which would otherwise be read-out in the wrong direction from the right to the left.

Switch actuator 30 also operates a reversing switch 132 by which motor 151 is reversed. When the switch actuator is in the illustrated position, motor 151 will turn in one direction so that spindle 7 will effect movement of the pick-up head 8 from the home position to the end position resulting in announcing of the number stored in the totalizer of the calculator. Reversing switch 132 will be shifted in the end position of pick-up head 8 so that motor 151 is reversed, reverses the direction of rotation of spindle 7, and effects return of pick-up head 8 from the end position to the home position.

A switch 133 is located in the circuit of motor 151 and is operated by any of the electromagnetic operating means 80 to 84, described with reference to FIGS. 1 and 2. For example, when numbers have been introduced into the calculator and a word is spoken into the microphone representing the totalizing operation, so that operating means 80 associated with total taking is actuated, switch 133 will be closed. However, it is possible to provide an independent operating means 134 schematically shown in FIG. 5, for operating switch 133 independently of a calculating operation, and such an operating means is controlled by a selector means responding to a predetermined word spoken into the microphone, as described for operating means 11.

The result announcing part of calculator 100 operates in the following manner: as explained above, when a number is stored in the register wheels 2 representing either a number introduced into the calculator, or the result of a calculating operation, the record carriers 4 assume digital indicating positions in which the respective number is shown by the indicia on the record carrier drums 4 in window 4*a*. At the same time, recordings 141, 142, 143 of words representing the digits registered in the several register wheels of the totalizer, will be placed in a read-out position located in the straight path of movement of the pick-up head 8.

For example, in the position illustrated in FIG. 3, a recording of a human voice saying the word zero will be in the read-out position in the highest order, and a recording of a human voice saying the word six will be in the read-out position in the lowest order.

When one of the operating means 80 and 84 is actuated by speaking a word representating a calculating operation or when operating means 134 is actuated in the same manner, switch 133 is closed and motor 151 starts and rotates spindle 7 so that pick-up head 8 travels from the left to the right as viewed in FIG. 3 from the home position to an end position. Impulses are produced in pick-up head 8 by the read-out recordings of the several record carriers 4 and since switch actuator 130 is in a position in which switch 131 connects announcing means 121, 122 with the pickup head 8, the digits represented by the read-out recordings and forming together the number stored in totalizer 2, are successively announced by speaker 122.

When pick-up head 8 arrives in its end position, switch actuator 130 shifted to the left as viewed in FIG. 3, motor 151 is reversed by reversing switch 132, and announcing means 121, 122 are disconnected from the pick-up head 8. Since the motor is reversed, the direction of rotation of spindle 7 is also reversed, and pick-up head 8 returns from the end position to the home position while switch 131 in the disconnected position prevents operation of the announcing means 121, 122. Upon arrival of pick-up head 8 in the home position, switch actuator 130 is again shifted so that switch 131 again connects the announcing means 121, 122 with the pick-up head 8, and motor 151 is reversed.

Switch actuator 130 is shifted in the direction of the arrow 136 in FIG. 5 beyond this position so that the arm 137 of switch actuator 130, which engages a projection 135 on switch 133, opens the same whereby the circuit of motor 151 is interrupted so that pick-up head 8 stops. The contacts of reversing switch 132 are slightly extended so that reversing switch 132 continues to connect motor 151 while switch 131 interrupts the connection between announcing means 121, 122 and pick-up head 8.

If the operator wishes to hear the announced number again, he may say the word by which the operating means 134 is actuated so that switch 133 cannot open, and switch actuator 130 cannot move beyond the position illustrated in FIG. 5 in solid lines, so that the travel of the pick-up head 8 to the right is repeated and the same announcement is made a second time.

Assuming that arm 137 has opened switch 133 in the home position, the next time switch 133 will be closed, switch actuator 130 will be first shifted a small distance to close switch 131 so that the pick-up head 8 is connected to the announcing means 121, 122 when the pick-up head starts its movement.

Referring again to the input of the calculator, if a series of digits is spoken in succession, the several words may be pronounced connected to each other. In order to facilitate the independent recognition by the selector means of command words representing digits or calculating functions, a phonetic sound which is not used in the command words may be added by the speaker at the end of each word. If, for example, the phonetic sound "k" is used for this purpose, w-u-n-k, t-oo-k, th-r-ee-k is pronounced instead of one, two, three.

A circuit part responsive to phonetic sound "k" is added to each selector means. The circuit part includes a tuned means, tuned to the electric wave produced by the microphone when the sound "k" is spoken, a relay controlling a switch connected in series with the respective electromagnetic operating means, and a switch controlled by the relay of the tuned means of the last phonetic sound of the word, and connected in series with the added relay. For example, the selector means for the sequence "t-oo" would have a third circuit part like the one for "n" in selector means 61, but the third tuned means would be tuned to "k." Each selector means 61–74 would have a corresponding circuit part added to the circuit parts required by the phonetic sounds forming the command word proper.

It will be understood that the announcing means which audibly reproduce recordings representing a number stored in the calculator, may also find a useful application in combination with a computer or calculator differing from the ten-key calculator described above.

While the invention has been illustrated and described as embodied in a speech controlled ten-key calculator announcing by speaker or ear phones the results of calculating operations, it is not intended to be limited to the details shown, since various modifications and structural changes may be made without departing in any away from the spirit of the present invention. For example, the electromagnetic relays described with reference to FIG. 1, may be advantageously replaced by electronic relays and switches, as will be apparent to those skilled in the art.

While the disclosed embodiment obtains the object of the invention, it will be understood that the invention is susceptible to modification, variation and change without departing from the scope, meaning and range of equivalence of the following claims.

I claim:

1. A computer comprising input means responsive to spoken words; means for carrying out computing operations under the control of said input means; means for representing the results of computing operations; record carrier means having recorded intelligence and controlled by said last-mentioned means to place recorded intelligence representing results of computing operations in a read-out position; read-out means for reading out said recorded in- carrier means having recorded intelligence and controlled by said read-out means for audibly reproducing recorded intelligence read-out in said read-out position.

2. A computer according to claim 1 wherein said input means include an input element responsive to a spoken word to actuate said read-out means to read out said recorded intelligence.

3. A calculator comprising digital and function controlling input means responsive to spoken words; a totalizer having an ordinal series of elements and tens transfer means; and ordinal series or record carrier members having recorded digits and being, respectively, controlled by said elements to place selected recorded digits representing a number stored in said totalizer in digits representing a number stored in said totalizer in a read-out position; read-out means for reading out recorded digits in said read-out position; and means controlled by said read-out means for audibly reproducing said number.

4. A calculator comprising digital and function controlling input means responsive to spoken words; a totalizer having an ordinal series of turnable elements and tens transfer means; an ordinal series of circular carrier drums having recorded digits spaced about the periphery thereof and being controlled by said elements, repectively, to place selected recorded digits representing a number stored in said totalizer in a read-out position in which said recorded digits are aligned in the axial direction of said drums along a straight path; read-out means movable along said path for reading out recorded digits in said read-out position; means actuated by said function controlling input means to perform calculating operations and to cause movement of said read-out means along said path; and means controlled by said read-out means for audibly reproducing said number.

5. A speech controlled announcing calculator comprising means for transforming speech sound energy representing digital information and operational information regarding calculating operations into electric energy; means for selectively converting the electric energy representing said digital information into input signals representing series of digits, and for converting the electric energy representing said operational information into command signals representing different calculating operations; calculating apparatus including means controlled by said input signals and by said command signals to perform different calculating operations, and register means for representing numbers which are the results of calculating operations; record carrier means having recordings of a human voice announcing numbers and controlled by said register means to place recordings representing said result numbers in a read-out position; read-out means cooperating with said record carrier means for reading out recordings in said read-out position; and announcing means controlled by said read-out means to audibly reproduce the read out recordings so that the result numbers of calculating operations are announced.

6. A speech controlled announcing calculator comprising a microphone for transforming spoken digital information and operational information regarding at least one calculating operation into electric energy; means for selectively converting electric energy representing digital information into digital command signals, and electric energy representing operational information into at least one operational command signal; calculating apparatus including digital input means actuated by said digital command signals, operating means actuated by said operational command signal for causing calculating operations with digits represented by actuated digital input means, and register means for representing the results of said calculating operations; record carrier means having recordings of a voice announcing numbers and controlled by said register means to place recordings representing the results of calculating operations in a read out position; pick-up means cooperating with said record carrier means for reading out recordings in said read-out position; and announcing means controlled by said read-out means to audibly reproduced the read-out recordings so that the results of calculating operations are announced.

7. A speech controlled announcing calculator comprising a microphone for transforming spoken digital information and operational information regarding at least one calculating operation into electric energy; means for selectively converting electric energy representing digital information into digital command signals, and electric energy representing operational information into at least one operational command signal; calculating apparatus including digital input means actuated by said digital command signals, operating means actuated by said operational command signal for causing calculating operations with digits represented by actuated digital input means, and a totalizer having register wheels and tens-transfer means, and representing the results of said calculating operations; a plurality of record carriers having recordings of a voice announcing numbers and controlled by said register wheels, respectively, to place recordings representing the results of calculating operations in a read out position; pick-up means cooperating with said record carriers for reading out recordings in said read-out position; and speaker means controlled by said read-out means to audibly reproduce the read-out recordings so that the results of calculating operations are announced.

8. A speech controlled announcing calculator comprising means for receiving different sequences of phonetic sounds respectively representing different digits and different calculating operations, said receiving means converting said different sound sequences into different waves respectively characteristic of said digits and of said different calculating operations; a plurality of selector means, each selector means being responsive to only one of said different waves and including means for producing a command signal representing a selected digit or calculating operation only when receiving the wave to which the respective selector means is responsive, said selector means being connected to said receiving means to receive said waves from the same when the same receives sequences of phonetic sounds spoken by an operator and selected by the same to represent selected digits or a calculating operation; a plurality of operating means, some of said operating means being associated with said digits and other of said operating means being associated with said calculating operations, each operating means being operatively connected with one of said selector means, respectively, to receive a command signal from the same, and being operable by the respective command signal to assume an actuated condition; calculating apparatus controlled by each of said operating means in said actuated condition to perform with digits selected by the operator by sounding selected sequences, a different calculating operation selected by the operator by sounding another selected sequence, and including register means for representing numbers; record carrier means having recordings of a human voice announcing numbers and controlled by said register means to place recordings representing said result numbers in a read-out position; read-out means cooperating with said record carrier means for reading out recordings in said read-out position; and announcing means controlled by said read-out means to audibly reproduce the read out recordings so that the result numbers of calculating operations are announced.

9. A speech controlled announcing calculator comprising means for transforming speech sound energy representing digital information and operational information regarding calculating operations into electric energy; means for selectively converting the electric energy representing said digital information into input signals representing series of digits, and for converting the electric energy representing said operational information into control signals representing different calculating operations; means controlled by said input signals and by said control signals to perform different calculating operations; register means including a plurality of ordinal register wheels and tens-transfer means, each register wheel being turnable between ten digital positions for representing different digits so that said register means represents a number represented by said input signals or the result of a calculating operation made under the control of said control signals; a plurality of circular record carrier drums, each record carrier drum having a circular row of recordings of a human voice announcing digits, said rows being parallel and said recordings extending in the axial direction of said drums, said record carrier drums being rotated by said ordinal register wheels, respectively, to turn between a series of digital positions in which a plurality of recordings of different record carrier drums are aligned in an axial read-out direction in read-out positions; read out means aligned in said read-out direction with said plurality of recordings in said read-out positions; drive means for moving said read-out means relative to said record carrier drums in said read-out direction so that said recordings aligned in said read-out positions are successively read-out and impulses are created in said read-out means; and announcing means electrically connected with said read-out means for transforming said impulses into audible reproductions of the recorded voice whereby the digits represented by said register wheels and said record carrier drums are successively announced by a human voice to form an announcement of said number.

10. A speech controlled announcing calculator comprising receiving means for receiving sequences of phonetic sounds and for converting said phonetic sounds into corresponding complex electrical waves; a plurality of selector means, each selector means including tuned means tuned to different complex electrical waves having characteristic frequency components and corresponding to different and distinct phonetic sounds, and means responsive to a selected sequence of the respective complex electrical waves to produce an electrical command signal when the respective selector means receives in a selected succession all the complex electrical waves to which the respective tuned means are responsive, said tuned means of each selector means being tuned to a different combination of said complex electrical waves; all said selector means being operatively connected to said receiving means to receive complex electrical waves from the same representing phonetic sounds so that any selector means produces a command signal only when said receiving means receives a sequence of phonetic sounds producing the plurality of complex electrical waves to which the respective selector means is responsive; calculating apparatus including digital input means, and a plurality of operating means for actuating said calculating apparatus to perform with values introduced into said digital input means different calculating operations, said digital input means being respectively connected to different selector means and actuated by command signals produced by the same, and said plurality of operating means being respectively connected to other selector means of said plurality of selector means and actuated by command signals produced by the same, said calculating apparatus including a totalizer having a plurality of ordinal register elements and tens-transfer means, each register element being movable between a plurality of digital positions for representing different digits so that said register means represents a number introduced into said digital input means or the result of one of said calculating operations; read-out means; record carrier means including a plurality of circular ordinal record carriers, each record carrier having a circular row of recordings of a voice announcing successive digits, said record carriers, being, respectively, controlled by said ordinal register elements of said calculating apparatus to associate said read-out means with the recordings of said record carriers which are recorded announcements of the digits represented by the digital position of said ordinal register elements, respectively; means for effecting successive reading out by said read-out means of said recordings of said record carriers which together represent said number; and announcing means controlled by said read-out device to audibly announce the digits of the read out recordings whereby any number represented by said register means is announced as a reproduction of human speech.

11. A calculator as set forth in claim 10 wherein each of said selector means includes a series of tuned means, and means for causing said tuned means of each selector means to respond in a predetermined sequence, the last tuned means in said sequence of each selector means being tuned to the same electric wave produced by said receiving means of the same phonetic sound, and the other tuned means of each said selector means being tuned to other electric waves corresponding to other phonetic sounds.

12. A calculator as set forth in claim 10 wherein said record carriers are concentric circular drums with a common axis having said recordings spaced about the peripheries thereof and extending parallel to said axis.

13. A speech controlled calculator comprising a microphone for converting sequences of phonetic sounds into corresponding electric waves; a plurality of selector means connected with said receiving means, each selector means including a series of tuned means tuned to different electric waves corresponding to different phonetic sounds, means causing said series of tuned means to respond only to a selected sequence of said waves, and means responsive to said selected sequence of said waves to produce an electric command signal, said series of tuned means of each selector means being tuned to a different sequence of said electric waves, the last tuned means in said sequence of each series being tuned to the same electric wave produced by said microphone of the same phonetic sound, and the other tuned means of each selector means being tuned to other electric waves corresponding to other phonetic sounds; and calculating apparatus including digital input means and operating means for actuating said calculating apparatus to perform calculating operations with values introduced into said digital input means, said digital input means being respectively connected to different selector means and actuated by said command signals, and said operating means being respectively connected to other selector means and actuated by said command signals of the same, register means; and means for perceptibly representing the results of said calculating operations registered in said register means.

14. A speech controlled apparatus comprising a microphone for converting sequences of phonetic sounds into corresponding electric waves; a plurality of selector means connected with said receiving means, each selector means including a series of tuned means tuned to different electric waves corresponding to different phonetic sounds, means causing said series of tuned means to respond only to a selected sequence of said waves, and means responsive to said selected sequence of said waves to produce an electric command signal, said series of tuned means of each selector means being tuned to a different sequence of said electric waves, the last tuned means in said sequence of each series being tuned to the same electric wave produced by said microphone of the same phonetic sound, and the other tuned means of each selector means being tuned to other electric waves corresponding to other phonetic sounds; and a plurality of operating means respectively connected with said selector means for receiving said command signals and being controlled by the same to perform different operations.

References Cited

UNITED STATES PATENTS

| | | | |
|---|---|---|---|
| 2,855,585 | 10/1958 | Quinby | 340—174.1 |
| 3,163,819 | 12/1964 | Calhoun | 179—100.2 |
| 3,215,821 | 11/1965 | Stenby | 235—151 |

OTHER REFERENCES

Bandat et al.: IBM Technical Disclosure Bulletin, vol. 7, No. 11, April 1965, pp. 974–5.

MALCOLM A. MORRISON, *Primary Examiner.*

MARTIN P. HARTMAN, *Assistant Examiner.*

UNITED STATES PATENT OFFICE

CERTIFICATE OF CORRECTION

Patent No. 3,356,836 December 5, 1967

Walter H. Stenby

It is hereby certified that error appears in the above numbered patent requiring correction and that the said Letters Patent should read as corrected below.

Column 7, line 66, for "carrier means having recorded intelligence and" read -- telligence in said read out position; and means --; column 8, line 1, for "and" read -- an --; same line 1, for "or" read -- of --; line 4, strike out "in digits representing a"; same column 8, line 5, strike out "number stored in said totalizer".

Signed and sealed this 24th day of December 1968.

(SEAL)
Attest:

Edward M. Fletcher, Jr.
Attesting Officer

EDWARD J. BRENNER
Commissioner of Patents